United States Patent
Natori (10) Patent No.: US 9,182,832 B2
(45) Date of Patent: Nov. 10, 2015

(54) DISPLAY DEVICE, CONTROL METHOD OF DISPLAY DEVICE AND PROGRAM

(75) Inventor: Takashi Natori, Suwa (JP)

(73) Assignee: SEIKO EPSON CORPORATION, Tokyo (JP)

(*) Notice: Subject to any disclaimer, the term of this patent is extended or adjusted under 35 U.S.C. 154(b) by 171 days.

(21) Appl. No.: 13/567,329

(22) Filed: Aug. 6, 2012

(65) Prior Publication Data
US 2013/0050072 A1 Feb. 28, 2013

(30) Foreign Application Priority Data
Aug. 25, 2011 (JP) .................................. 2011-183205

(51) Int. Cl.
G06F 3/03 (2006.01)
G06F 3/0488 (2013.01)
G06F 3/0354 (2013.01)

(52) U.S. Cl.
CPC .......... *G06F 3/0308* (2013.01); *G06F 3/03545* (2013.01); *G06F 3/04883* (2013.01)

(58) Field of Classification Search
CPC ............. B43L 1/004; B43L 9/00; B43L 9/02; G03B 21/14; G06F 3/03; G06F 3/0304; G06F 3/0308; G06F 3/0325; G06F 3/03545; G06F 3/04883
USPC ..................... 345/156–183; 353/42; 382/103; 715/211, 716, 719
See application file for complete search history.

(56) References Cited

U.S. PATENT DOCUMENTS

| | | | |
|---|---|---|---|
| 5,455,906 A | 10/1995 | Usuda | |
| 6,720,949 B1 * | 4/2004 | Pryor et al. | 345/158 |
| 2002/0163508 A1 * | 11/2002 | Hasegawa | 345/173 |
| 2003/0178493 A1 * | 9/2003 | Njolstad | 235/472.03 |
| 2006/0007123 A1 * | 1/2006 | Wilson et al. | 345/156 |
| 2006/0033713 A1 * | 2/2006 | Pryor | 345/158 |
| 2006/0082546 A1 * | 4/2006 | Wey | 345/156 |
| 2007/0182725 A1 * | 8/2007 | Pittel | 345/179 |
| 2011/0169748 A1 * | 7/2011 | Tse et al. | 345/173 |
| 2011/0175821 A1 * | 7/2011 | King | 345/173 |
| 2011/0249019 A1 * | 10/2011 | Chen | 345/593 |
| 2012/0295704 A1 * | 11/2012 | Reiche et al. | 463/31 |

FOREIGN PATENT DOCUMENTS

| | | |
|---|---|---|
| JP | H05-266164 A | 10/1993 |
| JP | A-5-330289 | 12/1993 |
| JP | 2007-033205 A | 2/2007 |
| JP | A-2009-205363 | 9/2009 |
| JP | 2010-284797 A | 12/2010 |

OTHER PUBLICATIONS

"Multifunctional Electronic Pen," http://panasonic.net/pcc/eboard/ub-t880w_t880/features.html#features01.

* cited by examiner

*Primary Examiner* — Hong Zhou
(74) *Attorney, Agent, or Firm* — Oliff PLC (57) ABSTRACT

A display device includes a display unit to display a video screen on a display surface, a information detection unit to detect position information of a plurality of detection points arranged on a stationery tool imitating a shape of a stationery, and identification information added to the plurality of detection points respectively and different among the plurality of detection points, and an angle determination unit to determine a rotation angle of the stationery tool on the display surface based on the position information of the plural detection points.

33 Claims, 6 Drawing Sheets

DISPLAY DEVICE, CONTROL METHOD OF DISPLAY DEVICE AND PROGRAM

The entire disclosure of Japanese Patent Application No. 2011-183205, filed Aug. 25, 2011 is expressly incorporated by reference herein.

BACKGROUND

1. Technical Field

The present invention relates to a display device which displays a video screen on a display surface and performs display control of the video screen in accordance with an operation to the display surface, a control method of the display device and a program.

2. Related Art

Hitherto, as this type of display device, there is known a display device which includes many sensors to detect a locus of a character or the like written on a writing surface of an electronic board by a pen-like writing instrument, recognition means for recognizing the character and figure drawn on the writing surface based on image data of the locus detected by the sensors, command execution means for editing the recognized character and figure in accordance with an edit command, and projection display means for displaying the edited character and figure on the writing surface (see JP-A-5-330289).

In this display device, edit commands such as erasure, movement, copy, and call are prepared, and the command execution means executes the erasure, movement or copy of the character and figure in accordance with the edit command inputted by the writing instrument.

At school or the like, as in a lesson of how to use a triangle ruler or a protractor, there is a case where a stationery is suitably rotated, and its usage is taught. In such a lesson, when the related art display device is used, since a figure can not be rotated, there is a problem that after a figure is drawn, a figure obtained by rotating the figure must be additionally drawn. Besides, although it is conceivable that a command to rotate a figure is installed as an edit command of the pen-like writing instrument, there is a problem that the number of edit commands of the pen-like writing instrument increases, and the operation becomes complicated.

SUMMARY

An advantage of some aspects of the invention is to provide a display device which can easily rotate a displayed figure by an intuitive operation, a control method of the display device and a program.

An aspect of the invention is directed to a display device including a display unit to display a video screen on a display surface, a information detection unit to detect position information of plural detection points arranged on a stationery tool imitating a shape of a stationery, and identification information added to the plurality of detection points respectively and different among the plurality of detection points, and an angle determination unit to determine a rotation angle of the stationery tool on the display surface based on the position information of the plurality of detection points.

In this case, it is preferable that a display control unit to display an object corresponding to the stationery tool is further provided, and the display control unit rotates and displays the object based on the determined rotation angle of the stationery tool.

Another aspect of the invention is directed to a control method of a display device to display a video screen on a display surface includes detecting position information of a plurality of detection points arranged on a stationery tool imitating a shape of a stationery, and identification information added to the plurality of detection points respectively and different among the plurality of detection points, determining a rotation angle of the stationery tool on the display surface based on the position information of the plurality of detection points, and displaying an object corresponding to the stationery tool on the video screen, wherein the object is rotated and displayed based on the determined rotation angle of the stationery tool.

According to this configuration, since the rotation angle of the stationery tool is determined and is reflected on the object on the video screen, the corresponding object (figure) can be easily rotated by an intuitive operation by only rotating the stationery tool. For example, an object of a triangle ruler or a protractor can be rotated by rotating a stationery tool of the triangle ruler or a stationery tool of the protractor.

It is preferable that in the display device, the stationery is one of a ruler and a protractor.

According to this configuration, the ruler or the protractor can be rotated and displayed. Incidentally, the "ruler" here is not limited to a straightedge, but may be, for example, a triangle ruler or the like.

Besides, it is preferable that a type determination unit to determine a type of the stationery tool based on a combination of the detected identification information of the plural detection points is further provided, and the display control unit displays the object corresponding to the type determined by the type determination unit.

When different identification information are assigned to all the detection points of various stationery tools, the number of identification information increases and the detection process becomes complicated.

On the other hand, according to this configuration, since the type of the stationery tool is determined based on the combination of the identification information, the number of the identification information can be decreased. Thus, the detection process of the identification information becomes easy.

Besides, it is preferable that the information detection unit detects operation information of operator disposed in the stationery tool, and the display control unit changes a size and/or a color of the object based on the detected operation information.

According to this configuration, a mode of the object can be changed by the operation on the stationery tool.

Besides, it is preferable that the display control unit displays a rotational locus of the object when the object is rotated.

According to this configuration, since the rotational locus of the object is displayed, the movement of the object can be displayed.

In this case, it is preferable that the display surface is a projection surface, and the display unit projects the video screen onto the projection surface.

According to this configuration, the object can be displayed on a screen, a wall or a whiteboard. That is, as the display device, an electronic board (interactive whiteboard) can be used.

Still another aspect of the invention is directed to a computer readable storage medium storing a program which causes a computer to execute the control method of the display device.

According to this configuration, the control method of the display device can be executed by only installing the program stored by a computer readable storage medium.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
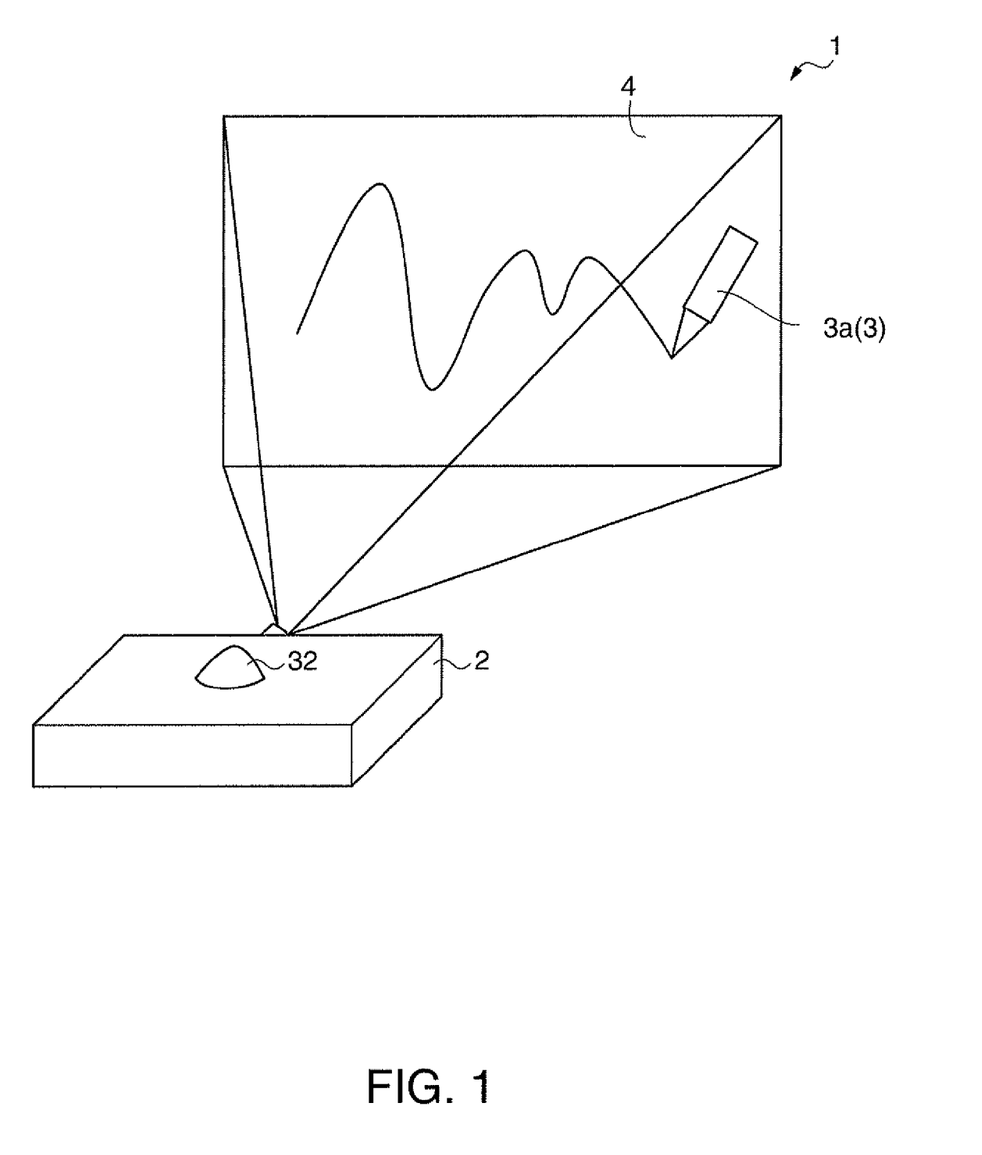
FIG. 1 is a schematic view of a projector system of an embodiment.
Figure 2:
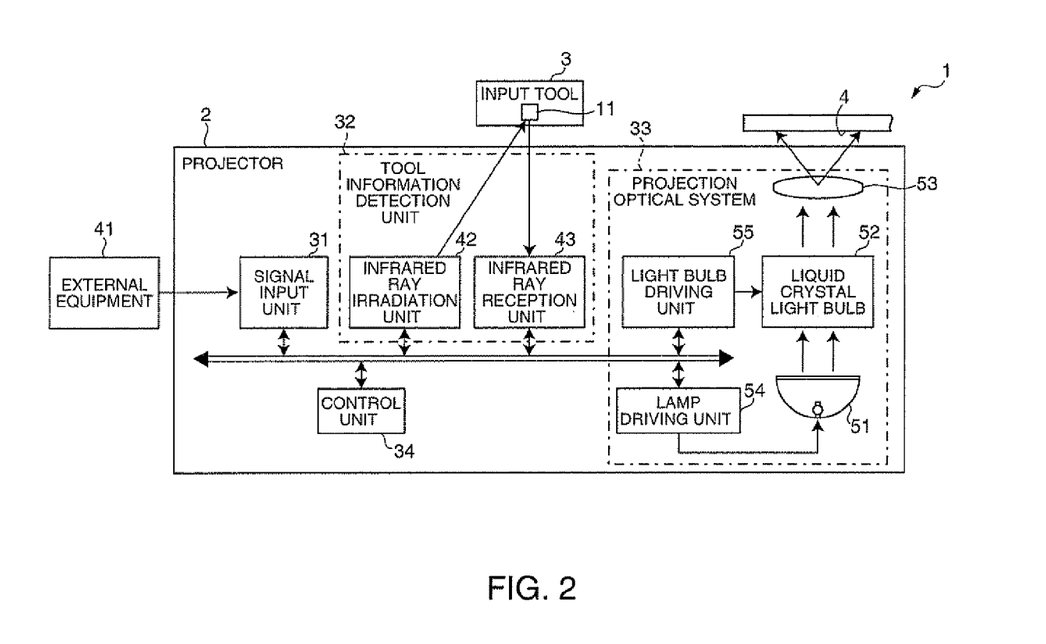
FIG. 2 is a control block diagram of the projector system.

Hereinafter, a display device, a control method of the display device and a program according to an embodiment of the invention will be described with reference to the accompanying drawings. In this embodiment, a projector system will be exemplified in which a projector as a display device is a component. As shown in FIG. 1 and FIG. 2, a projector system 1 includes a projector (display device) 2 to project a video screen on a projection surface (display surface) 4, and plural types of input tools 3 to perform an operation on the projection surface 4. That is, the projector system 1 has a function as an electronic board (interactive whiteboard).

Figure 3:
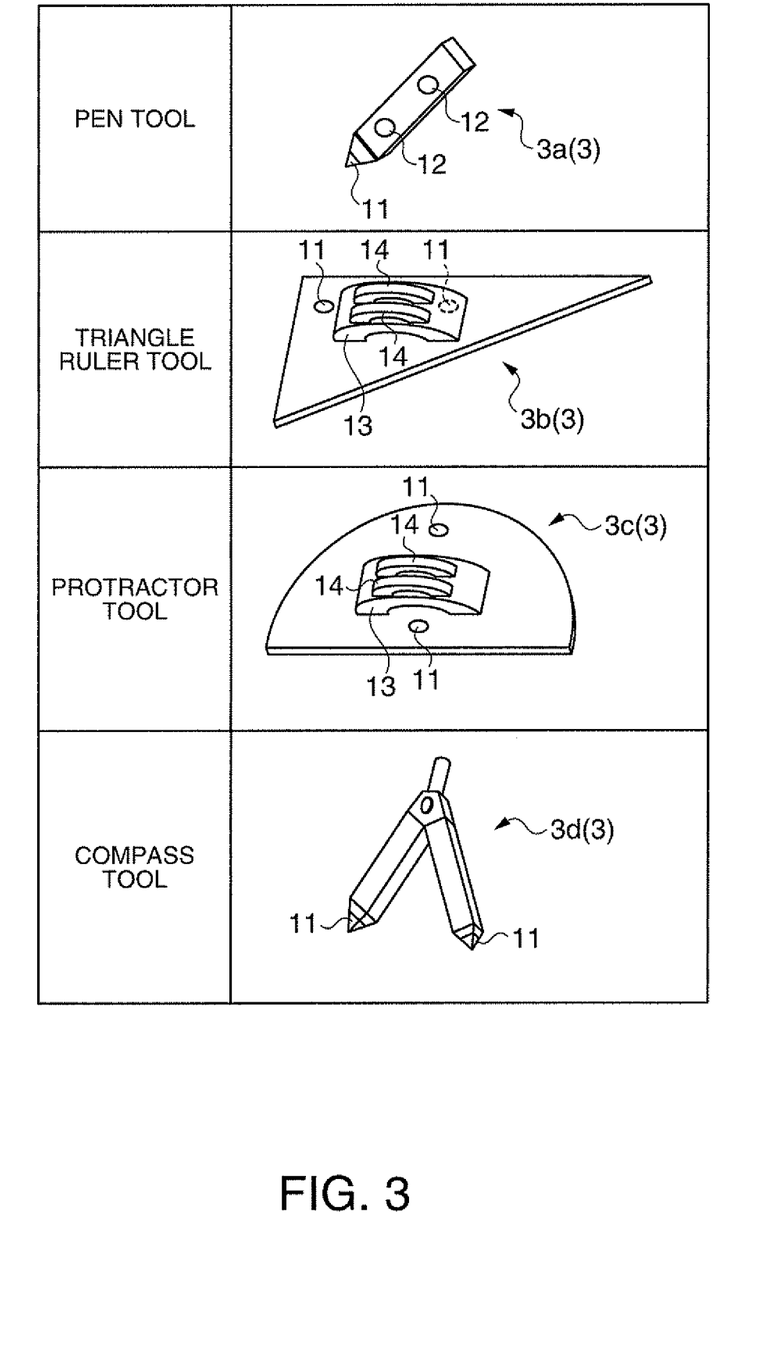
FIG. 3 is a view showing respective input tools.
Figure 4A:
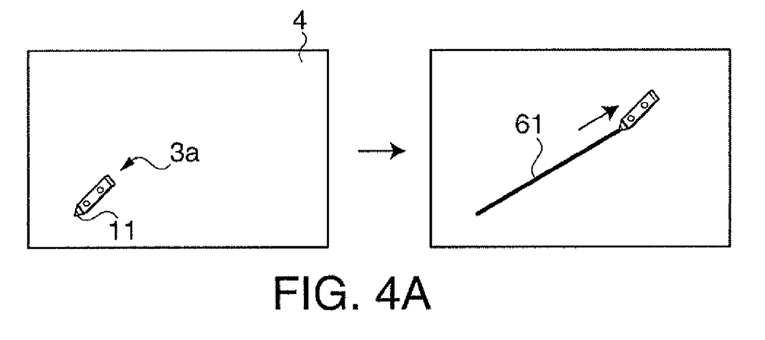
FIGS. 4A to 4D are explanatory views for explaining display control based on operations of the respective input tools.
Figure 4B:
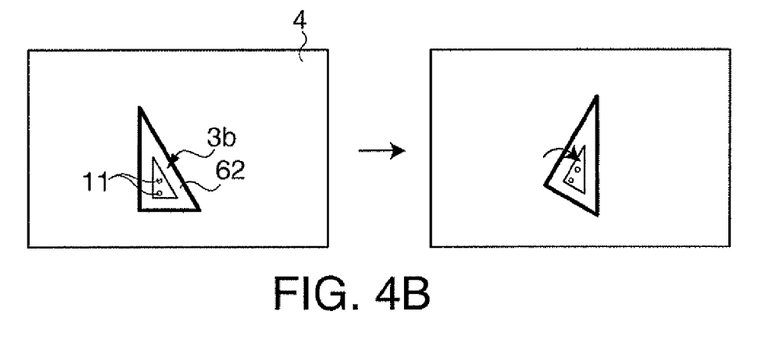
Figure 4C:
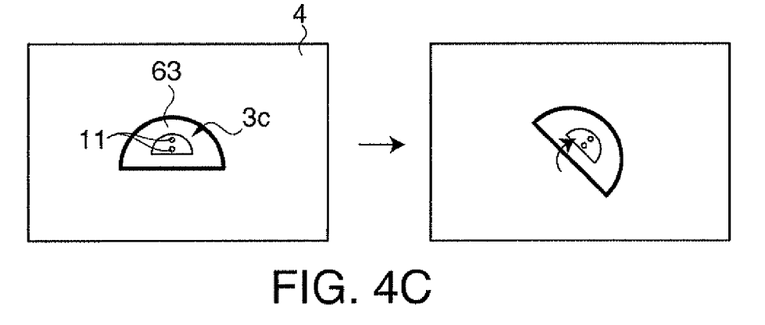
Figure 4D:
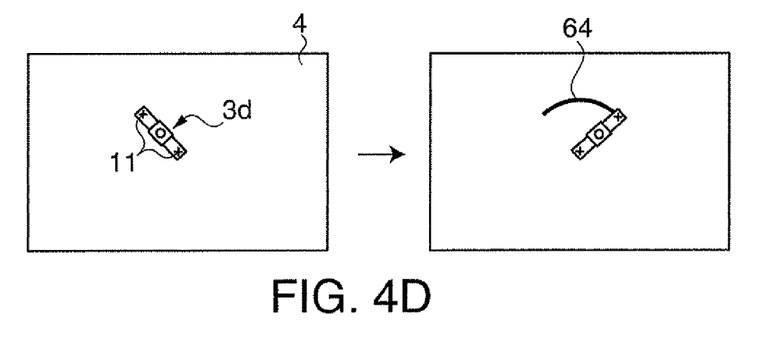

As shown in FIG. 3, the input tool 3 is a tool which is made to face the projection surface 4, and performs a drawing operation of drawing on the video screen and a display operation of displaying a specific object on the video screen. The plural types of input tools 3 include a pen tool 3a (electronic pen), a triangle ruler tool (stationery tool) 3b, a protractor tool (stationery tool) 3c and a compass tool 3d. Incidentally, plural input tools 3 may be provided for each of the types. Besides, at least one modulation reflection unit 11 is disposed in each of the input tools 3, and the disposition position of the modulation reflection unit 11 is a detection point for detecting the position information of the input tool 3. The modulation reflection unit 11 modulates an infrared ray irradiated from the projector 2 into a specific pattern and reflects the infrared ray to the projector 2. On the other hand, although the details will be described later, the projector 2 receives the modulated and reflected infrared ray, and detects the position information of the detection point of the input tool 3. Incidentally, the modulation reflection unit 11 modulates the infrared ray into the specific pattern which includes an identification signal to identify the input tool 3 and the detection point, and an operation signal indicating the operation content of operators (an attribute change button 12 and an attribute change dial 14 described later) on the input tool 3, so that the projector 2 can detect the identification information and the operation information.

The pen tool 3a imitates the shape of a pen, and includes the modulation reflection unit 11 disposed at a tip section and the attribute change button 12 disposed on a side surface. That is, the detection point of the pen tool 3a is arranged at the tip section thereof. A drawing operation to the projection screen is performed by an operation of moving the tip section of the pen tool 3a on the projection surface 4. Besides, the color and thickness of a drawn line (line object 61) can be changed by depressing the attribute change button 12.

The triangle ruler tool 3b imitates the shape of a triangle ruler (stationery: ruler), and includes two modulation reflection units 11 disposed at separate positions, a grip 13 disposed on the surface of a main body, and two attribute change dials (operators) 14 disposed on the grip 13. That is, the detection points of the triangle ruler tool 3b are arranged at the two separate places of the main body. The main body of the triangle ruler tool 3b is made to face the projection surface 4, and a display operation to display a triangle ruler object (after-mentioned triangle ruler object 62) on the video screen is performed. Besides, the color and size of the triangle ruler object to be displayed can be changed by operating the respective attribute change dials 14.

The protractor tool 3c imitates the shape of a protractor (stationery), and includes the two modulation reflection units 11 disposed at separate positions, the grip 13 disposed on the surface of a main body, and the two attribute change dials (operators) 14 disposed on the grip 13. That is, the detection points of the protractor tool 3c are arranged at the two separate places of the main body. The main body of the protractor tool 3c is made to face the projection surface 4, and a display operation to display a protractor object (after-mentioned protractor object 63) on the video screen is performed. Besides, the color and size of the protractor object to be displayed can be changed by operating the respective attribute change dials 14. Incidentally, it is preferable that the attribute change dial 14 to change the color in the triangle ruler tool 3b and the protractor tool 3c has a click feeling at the change of attribute.

The compass tool 3d imitates the shape of a compass, and includes the two modulation reflection units 11 disposed at tip sections of two legs. That is, the detection points of the compass tool 3d are disposed at the tip sections of the two legs. The tip section of one of the legs is placed on the projection surface 4, this is not moved but is rotated, and the other leg is moved on a rotational locus, so that a drawing operation of an arc or a circle on the video screen is performed. Incidentally, similarly to a compass, the opening angle of the two legs of the compass tool 3d can be freely changed, and a circle having an arbitrary size can be drawn.

As shown in FIG. 2, the projector 2 includes a signal input unit 31, a tool information detection unit (information detection unit) 32, a projection optical system (display unit) 33, and a control unit 34 to overall control these. An angle determination unit and a display control unit in the appended claims are constructed of the control unit 34.

The signal input unit 31 inputs image data from an external equipment 41 such as a PC (Person Computer), a USB memory or a compact flash (registered trademark). In this case, the signal input unit 31 includes a not-shown USB port or a memory card slot. Incidentally, in this embodiment, although image data is inputted from the external equipment 41 through the signal input unit 31, an image signal may be inputted from a video equipment such as a video recorder or a DVD player. In this case, the signal input unit 31 includes an HDMI terminal, an S-video terminal, a video terminal and the like.

The tool information detection unit 32 detects position information and identification information of the respective detection points of the respective input tools 3 based on the infrared ray modulated and reflected by the modulation reflection unit 11, and detects the operation information of the respective input tools 3. Specifically, the tool information detection unit 32 includes an infrared ray irradiation unit 42 to irradiate an infrared ray to the projection surface 4, and an infrared ray reception unit 43 to receive the infrared ray modulated and reflected by the modulation reflection unit 11 of the input tool 3, and detects the position information of the respective detection points based on the infrared rays reflected from the respective detection points. Besides, the infrared ray modulated into a specific pattern including an identification signal and an operation signal is received, so that the identification information of the input tool 3 and the respective detection points based on the identification signal, and the operation information of the input tool 3 based on the operation signal are detected. The position information is coordinate information of the position of the detection point relative to the projection surface 4. The identification information is information for identifying the respective input tools 3 and the respective detection points. Thus, the identification information different among the respective detection points is added to the respective detection points. The operation information is information indicating the operation content of an operation to the operator (the attribute change button 12, the attribute change dial 14) on the input tool 3. Since the tool information detection unit 32 detects the identification information of the respective detection points together with the position information of the respective detection points, the control unit 34 can identify that the detected position information is information of which detection point.

The projection optical system 33 projects an image on the projection surface 4, and includes a light source lamp 51, a liquid crystal light bulb 52, a projection lens 53, a lamp driving unit 54 and a light bulb driving unit 55.

A halogen lamp, a metal halide lamp or a high pressure mercury lamp can be applied as the light source lamp 51. A solid lamp such as a laser or an LED may be used instead of the light source lamp 51. The liquid crystal light bulb 52 includes a liquid crystal panel and the like in which a liquid crystal is sealed between a pair of transparent substrates, and transparent electrodes capable of applying drive voltages to respective minute areas of the liquid crystal are formed in a matrix form as pixels on the inner surfaces of the respective transparent substrates. The lamp driving unit 54 turns on the light source lamp 51 based on a lighting instruction from the control unit 34. The light bulb driving unit 55 sets the light transmittance of the respective pixels by applying drive voltages corresponding to image data to the respective pixels of the liquid crystal light bulb 52.

With the above configuration, in the projection optical system 33, the illumination light emitted from the light source lamp 51 passes through the liquid crystal light bulb 52 and is modulated. The modulated image light is synthesized for the respective pixels by a not-shown light synthesizing optical system (dichroic prism etc.), and is projected onto the projection surface 4 by the projection lens 53.

The control unit 34 includes a CPU (Central Processing Unit), a ROM (Read Only Memory), a RAM (Random Access Memory) and the like. The CPU is a central processing unit to perform various arithmetic processes, and overall controls the projector 2 by performing input and output of signals with the each unit. The ROM stores control programs and control data used by the CPU to perform various arithmetic processes. Besides, the ROM stores also an OS (Operating System) as basic software. The RAM is used as a work area when the CPU performs various arithmetic processes. Incidentally, in this embodiment, display control based on the operation of the input tool 3 is especially performed.

Here, the display control based on the operation of the respective input tools 3 will be described in order of the pen tool 3a, the triangle ruler tool 3b, the protractor tool 3c and the compass tool 3d with reference to FIGS. 4A to 4D. Incidentally, identification information different among the respective input tools 3 is assigned to the respective input tools 3, and the control unit 34 determines the type (the pen tool 3a, the triangle ruler tool 3b, etc.) of the input tool 3 based on the identification information detected by the tool information detection unit 32.

In the display control to the pen tool 3a, the projector 2 receives the infrared ray from the modulation reflection unit 11 of the pen tool 3a by the tool information detection unit 32 at all times, and detects the position information and the identification information of the detection point, and the operation information. The control unit 34 determines the movement locus of the detection point on the projection surface 4 based on the detected position information of the detection point. When the movement locus is determined, the line object 61 is displayed on the video screen correspondingly to the determined movement locus (see FIG. 4A). At this time, the color and thickness of the line object 61 are changed based on the operation information. That is, the control unit 34 changes the color and thickness of the line object 61 according to the depression of the attribute change button 12.

In the display control to the triangle ruler tool 3b, the projector 2 receives the infrared rays from the two modulation reflection units 11 of the triangle ruler tool 3b by the tool information detection units 32 at all times, and detects the position information and the identification information of the respective detection points, and the operation information (information detection step). At each time of detection, the control unit 34 determines the position of the triangle ruler tool 3b on the projection surface 4 and the rotation angle from the initial posture based on the detected position information (angle determination step). When the position and the rotation angle are determined, the object (hereinafter, the triangle ruler object 62) indicating the triangle ruler is displayed at the position on the video screen corresponding to the determined position, and is rotated and displayed on the video screen correspondingly to the determined rotation angle (display control step: see FIG. 4B). At this time, the color and size of the triangle ruler object 62 are changed based on the operation information. That is, the control unit 34 changes the color and size of the triangle ruler object 62 according to the operation of the attribute change dial 14.

In the display control to the protractor tool 3c, the projector 2 receives the infrared rays from the two modulation reflection units 11 of the protractor tool 3c by the tool information detection unit 32 at all times, and detects the position information and the identification information of the respective detection points, and the operation information (information detection step). At each time of detection, the control unit 34 determines the position of the protractor tool 3c on the projection surface 4 and the rotation angle from the initial posture based on the detected position information (angle determination step). When the position and the rotation angle are determined, the object (hereinafter, the protractor object 63) indicating the protractor is displayed at the position on the video screen corresponding to the determined position, and is rotated and displayed on the video screen correspondingly to the determined rotation angle (display control step: see FIG. 4C). At this time, the color and size of the protractor object 63 are changed based on the operation information. That is, the control unit 34 changes the color and size of the protractor object 63 according to the operation of the attribute change dial 14.

In the display control to the compass tool 3d, the projector 2 receives the infrared rays from the two modulation reflection units 11 of the compass tool 3d by the tool information detection unit 32 at all times, and detects the position information and the identification information of the respective detection points, and the operation information. The control unit 34 determines the drawing operation of the compass tool 3*d* to draw an arc or a circle based on the detected position information. The drawing operation is an operation in which the detection point at the fulcrum point side is not moved, and the other detection point is moved along the rotational orbit with the center at the detection point on the fulcrum point side. The presence or absence of the drawing operation is determined based on the position change of the respective detection points, and the fulcrum point position of the drawing operation, the drawing start position of the drawing operation and the drawing end position are determined based on the position information of the respective detection points before and after the operation. When these are determined, a line object 64 of a circle or an arc is displayed on the video screen correspondingly to the determined drawing operation (see FIG. 4D).

According to the configuration as stated above, since the rotation angle of the stationery tool (the triangle ruler tool 3*b*, the protractor tool 3*c*) is reflected on the object (the triangle ruler object 62, the protractor object 63) on the video screen, by merely rotating the stationery tool, the corresponding object (figure) can be easily rotated by the intuitive operation.

Besides, the size and/or the color of the object is changed according to the operation of the attribute change dial 14 disposed on the stationery tool, and the mode (appearance) of the object can be changed by the operation on the stationery tool.

In this embodiment, the identification information different among the respective input tools 3 is assigned to the respective input tools 3, and the type of the input tool 3 is determined based on this. However, this configuration may be modified such that the control unit 34 determines the type of the input tool 3 based on a combination of detected identification information of plural detection points (type determination unit), and displays an object corresponding to the determined type. That is, for example, identification number 1 and identification number 2 are assigned to the two detection points of the triangle ruler tool 3*b*, and identification number 1 and identification number 3 are assigned to the two detection points of the protractor tool 3*c*. When the combination of the identification number 1 and the identification number 2 is detected, the input tool is determined to be the triangle ruler tool 3*b*, and when the combination of the identification number 1 and the identification number 3 is detected, the input tool is determined to be the protractor tool 3*c*. According to the configuration as stated above, as compared with the case where different identification information is assigned to all the detection points of the plural input tools 3, the number of identification information can be decreased. Thus, the detection process of the identification information by the tool information detection unit 32 becomes easy. Incidentally, the distance between the two detection points is preferably made a constant distance irrespective of the input tool 3. According to this configuration, even when the plural input tools 3 are simultaneously used, the rotation angles of the respective input tools 3 can be accurately detected based on the distance between the detection points.

Figure 5A:
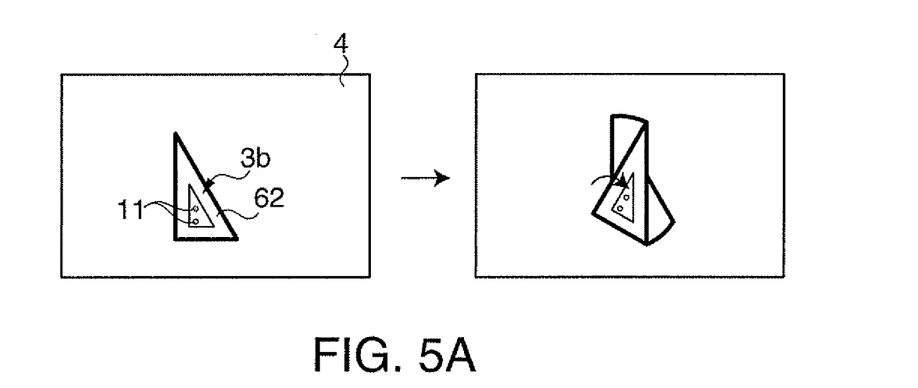
FIG. 5A is an explanatory view for explaining a modified example of display control based on the operation of a triangle ruler tool.
Figure 5B:
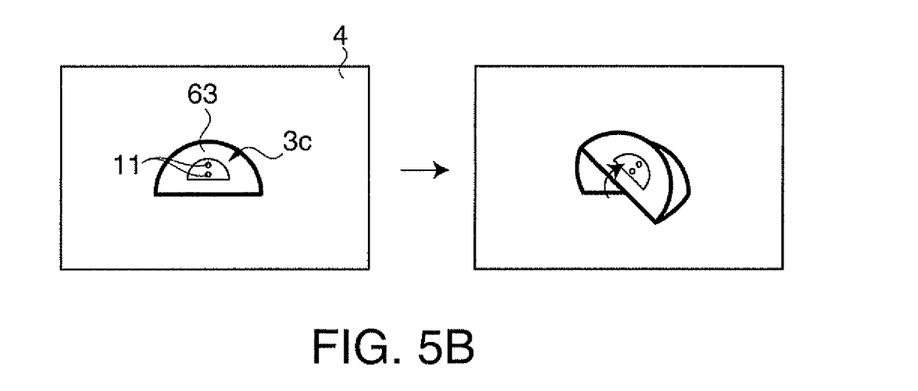
FIG. 5B is an explanatory view for explaining a modified example of display control based on the operation of a protractor tool.

Besides, as shown in FIGS. 5A and 5B, in this embodiment, when the triangle ruler object 62 or the protractor object 63 is rotated on the video screen, the rotational locus of the object may be displayed. According to this configuration, the movement of the object can be displayed by displaying the rotational locus of the object. Besides, the rotational locus can be preferably erased by the operation of the attribute change dial 14 at a timing desired by a user.

Figure 6A:
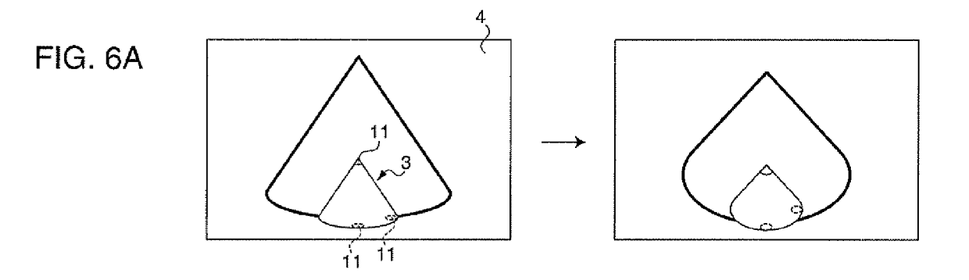
FIGS. 6A and 6B are explanatory views for explaining modified examples of input tools and display control.

Further, in the embodiment, the rotation angle of the triangle ruler tool 3*b* or the protractor tool 3*c* on the projection surface 4 is determined. However, this configuration may be modified such that a rotation angle in a three-dimensional coordinate is determined, and this is reflected on a three-dimensional object on the video screen. For example, the input tool 3 having a three-dimensional shape (in the drawing, the input tool 3 having a triangular pyramid shape) as shown in FIG. 6A is prepared, and the position information of three or more detection points arranged thereon in the three-dimensional coordinate are detected. Thereafter, the rotation angles of the input tool 3 in the three-dimensional coordinate are determined based on the position information of the respective detection points in the three-dimensional coordinate. Then, the control unit 34 rotates and displays a three-dimensional object corresponding to the input tool 3 correspondingly to the determined rotation angles in the three-dimensional coordinate. Incidentally, in order to identify the rotation angles in the three-dimensional coordinate, identification information different among the respective detection points is added also to the three or more detection points.

Figure 6B:
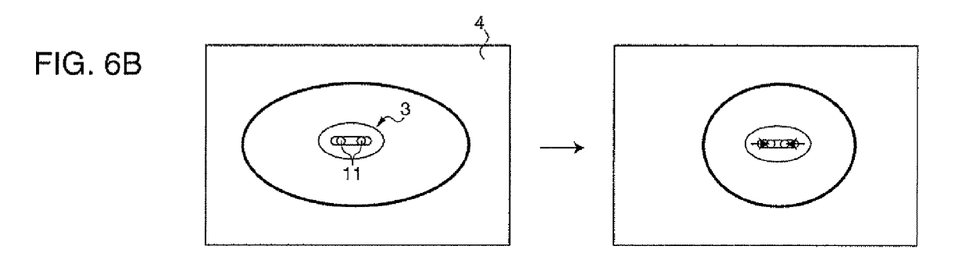

Further, in the embodiment, the detection points are fixedly arranged for the respective input tools 3. However, this configuration may be modified such that the detection point (the modulation reflection unit 11) is freely moved in the input tool 3, and the object on the video screen is modified and displayed correspondingly to the movement. For example, an elliptical input tool 3 as shown in FIG. 6B is prepared. The elliptical input tool 3 includes the two modulation reflection units 11 disposed to be symmetrically movable on the long axis. The two modulation reflection units 11, that is, the two detection points correspond to focal points of an elliptical object to be displayed, and the control unit 34 displays, on the video screen, an elliptical object in which the positions of the focal points are changed according to the symmetrical movement of the two modulation reflection units 11.

Incidentally, in the embodiment, the infrared ray is modulated and reflected at the respective detection points, and this is received so that the position information and the identification information of the respective detection points are detected. However, this configuration may be modified such that marks which can be identified by image recognition are arranged at the respective detection points, and the marks are image-recognized, so that the position information and the identification information of the detection points on the projection surface 4 are detected. Besides, when the board surface of the whiteboard is made the projection surface 4, the whole board surface is made to function as a sensor, and the position information and the identification information of the respective detection points may be detected.

Besides, in the embodiment, although the invention is applied to the projector 2 to project the video screen onto the projection surface 4, the invention may be applied to a display device (monitor) to display the video screen. In this case, the display surface in the appended claims is not the display device itself, but is a portion of the surface of the display device on which the video screen is displayed.

What is claimed is:

1. A display device comprising:
  a display unit to display a video screen on a display surface;
  an information detection unit to detect position information on the display surface of a plurality of detection points arranged on a tool having a shape of a stationery tool, the detection points being in contact with the display surface when being detected, and the tool having identification information added to the plurality of detection points, respectively, and the identification information being different among the plurality of detection points; and an angle determination unit to determine a rotation angle of the tool on the display surface based on the position information of the plurality of detection points.

2. The display device according to claim 1, further comprising:

a display control unit to display an object corresponding to the stationery tool, wherein the display control unit rotates and displays the object based on the determined rotation angle of the tool.

3. The display device according to claim 2, wherein the tool is one of a ruler and a protractor.

4. The display device according to claim 2, further comprising:

a type determination unit to determine a type of the tool based on a combination of the detected identification information of the plurality of detection points, wherein the display control unit displays the object corresponding to the type of the tool determined by the type determination unit.

5. The display device according to claim 2, wherein the information detection unit detects operation information of an operator of the tool, and the display control unit changes a size and/or a color of the object based on the detected operation information.

6. The display device according to claim 2, wherein the display control unit displays a rotational locus of the object when the object is rotated.

7. The display device according to claim 6, wherein the information detection unit detects operation information of an operator of the tool, and the display control unit erases the rotational locus based on the detected operation information.

8. The display device according to claim 1, wherein the display surface is a projection surface, and the display unit projects the video screen onto the projection surface.

9. The display device according to claim 1, wherein the position information indicates a position of the tool relative to the display surface.

10. A control method of a display device to display a video screen on a display surface, comprising:

detecting position information on the display surface of a plurality of detection points arranged on a tool having a shape of a stationery tool, the detection points being in contact with the display surface when being detected, and the tool having identification information added to the plurality of detection points, respectively, and the identification information being different among the plurality of detection points;

determining a rotation angle of the tool on the display surface based on the position information of the plurality of detection points; and displaying an object corresponding to the tool on the video screen, wherein the object displayed on the video screen is rotated based on the determined rotation angle of the tool.

11. A non-transitory computer readable storage medium storing a program to cause a computer to execute the control method of the display device according to claim 10.

12. A tool for use with a display device having a display surface, the tool comprising:

a tool body configured to be placed on the display surface; and a plurality of separate detection points provided on the tool body, when the tool body is placed on the display surface, the tool is configured to provide positions of the detection points on the display surface to the display device, the detection points being in contact with the display surface when being detected, and, based on the positions of the detection points, the display device displays a display object with a shape corresponding to a shape of the tool, and when the tool is rotated relative to the display surface, the tool provides the rotated positions of the detection points to the display device causing the display object to be rotated to a position on the display device corresponding to the rotated position of the detection points.

13. The tool according to claim 12, wherein the tool is configured to provide identification information for identifying the tool to the display device.

14. The tool according to claim 13, wherein the identification information further identifies each of the detection points.

15. The tool according to claim 12, wherein the display object has a position on the display corresponding to a position of the tool on the display surface.

16. The tool according to claim 12, wherein the tool includes two of the detection points.

17. The tool according to claim 12, wherein the display object has a size dimension bigger than a size dimension of the tool.

18. The tool according to claim 12, wherein the tool is a ruler tool.

19. A system comprising:

a display device having a display surface;

a tool configured to be placed on the display surface, the tool having a plurality of separate detection points;

a detection unit configured to detect positions of the plurality of separate detection points when the detection points are in contact with the display device; and a display control unit configured to, based on the detected positions of the detection points, display a display object on the display device in a shape corresponding to a shape of the tool, and when the tool is rotated relative to the display surface, the display control unit rotating the display object to a position on the display device corresponding to the rotated position of the detection points.

20. The system according to claim 19, wherein the tool is configured to provide identification information for identifying the tool to the display control unit.

21. The system according to claim 20, wherein the identification information further identifies each of the detection points.

22. The system according to claim 19, wherein the display object has a position on the display corresponding to a position of the tool on the display surface.

23. The system according to claim 19, wherein the tool includes two of the detection points.

24. The system according to claim 19, wherein the display object has a size dimension bigger than a size dimension of the tool.

25. The system according to claim 19, wherein the tool is a ruler tool.

26. The system according to claim 19, further comprising a pen tool having a tip configured to be placed on the display surface, the pen tool configured to convey a signal to the detection unit, the detection unit configured to determine a position of the pen tip based on the signal, and the display control unit configured to display an image on the display based on the determined position of the pen tip.

27. A method of utilizing a tool with a display device having a display surface, the tool having a plurality of separate detection points, the method comprising:
when the tool is placed on the display surface, detecting positions of the plurality of separate detection points on the display surface, the detection points being in contact with the display surface when being detected;
then displaying a display object on the display device in a shape corresponding to a shape of the tool; and
then the tool is rotated relative to the display surface, causing the display object to be rotated to a position on the display device corresponding to the rotated position of the detection points.

28. The method according to claim 27, further comprising providing identification information for identifying the tool to a display control unit of the display device.

29. The method according to claim 28, wherein the identification information further identifies each of the detection points.

30. The method according to claim 27, further comprising displaying the display object at a position on the display corresponding to a position of the tool on the display surface.

31. The method according to claim 27, wherein the tool includes two of the detection points.

32. The method according to claim 27, further comprising displaying the display object with a size dimension that is bigger than a size dimension of the tool.

33. The method according to claim 27, wherein the tool is a ruler tool.

* * * * *